(12) United States Patent
Patel

(10) Patent No.: US 7,090,135 B2
(45) Date of Patent: Aug. 15, 2006

(54) IMAGING ARRANGEMENT AND BARCODE IMAGER FOR IMAGING AN OPTICAL CODE OR TARGET AT A PLURALITY OF FOCAL PLANES

(75) Inventor: Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 205 days.

(21) Appl. No.: 10/650,241

(22) Filed: Aug. 28, 2003

(65) Prior Publication Data

US 2005/0006477 A1    Jan. 13, 2005

Related U.S. Application Data

(60) Provisional application No. 60/485,184, filed on Jul. 7, 2003.

(51) Int. Cl.
*G06K 7/10* (2006.01)

(52) U.S. Cl. .............. 235/462.2; 235/472.01

(58) Field of Classification Search ..............
235/462.01–462.47, 472.01, 472.02, 472.03, 235/454, 455, 494, 470, 385
See application file for complete search history.

(56) References Cited

U.S. PATENT DOCUMENTS

| | | | |
|---|---|---|---|
| 5,473,149 A | | 12/1995 | Miwa et al. |
| 5,640,001 A | * | 6/1997 | Danielson et al. ..... 235/462.23 |
| 5,804,805 A | * | 9/1998 | Koenck et al. ........ 235/462.01 |
| 5,837,987 A | * | 11/1998 | Koenck et al. ........ 235/462.27 |
| 6,138,915 A | * | 10/2000 | Danielson et al. ..... 235/472.02 |
| 6,315,200 B1 | * | 11/2001 | Silverbrook et al. ........ 235/454 |
| 6,375,075 B1 | | 4/2002 | Ackley et al. |
| 6,431,452 B1 | * | 8/2002 | Feng ...................... 235/472.01 |
| 6,540,361 B1 | * | 4/2003 | Hayashi ....................... 353/31 |
| 6,681,994 B1 | * | 1/2004 | Koenck ................. 235/472.01 |
| 6,819,400 B1 | * | 11/2004 | Ravensbergen .............. 355/55 |
| 6,839,307 B1 | * | 1/2005 | Ikai .......................... 369/44.14 |
| 2002/0008139 A1 | * | 1/2002 | Albertelli ..................... 235/385 |
| 2003/0029915 A1 | | 2/2003 | Barkan et al. |
| 2003/0226895 A1 | | 12/2003 | Havens et al. |
| 2004/0004125 A1 | | 1/2004 | Havens et al. |
| 2004/0004128 A1 | | 1/2004 | Pettinelli et al. |

FOREIGN PATENT DOCUMENTS

WO        03/104854 A2   12/2003

* cited by examiner

*Primary Examiner*—Thien M. Le
(74) *Attorney, Agent, or Firm*—Carter, DeLuca, Farrell & Schmidt, LLP

(57) ABSTRACT

Three non-complex imaging arrangements are provided where in two of the imaging arrangements a moveable carrier housing at least one objective lens is provided and, in the other imaging arrangement, at least one stationary objective lens and additional optical elements are provided. Each embodiment includes at least one fixed image sensor array for imaging thereon an optical code or target, such as a one-dimensional barcode symbol, or label, marking, picture, etc. Each imaging arrangement provides an extended working range of approximately 5–102 cm. The imaging arrangements are capable of being incorporated within a barcode imager to provide a non-complex barcode imager having an extended working range which is comparable to or greater than the working ranges of conventional image-based barcode imagers.

46 Claims, 3 Drawing Sheets

IMAGING ARRANGEMENT AND BARCODE IMAGER FOR IMAGING AN OPTICAL CODE OR TARGET AT A PLURALITY OF FOCAL PLANES

PRIORITY

The present application claims priority to a U.S. Provisional Application filed on Jul. 7, 2003 and assigned U.S. patent application Ser. No. 60/485,184, the contents of which are incorporated herein in their entirety.

BACKGROUND OF THE INVENTION

1. Field of the Invention

The present invention relates to the field of imaging, and specifically to an imaging arrangement and barcode imager for imaging an optical code or target at a plurality of focal planes.

2. Description of the Related Art

CCD or CMOS-based imaging devices, such as conventional barcode imagers, generally have limited working ranges on the order of 5–61 cm (~2–24 inches). In many cases, these imaging devices are designed to be handheld or at least moveable within a given area, thus compensating, somewhat, for the limited working range. However, the operator is still required to position the imaging device within the proper range to produce an adequately sharp, i.e. substantially focused image; this may require a trial and error approach on the part of the operator in order to obtain the proper distance from the target to be imaged.

In applications where the imaging device is kept stationary, such as in an assembly line where the imaging device is generally fixed for imaging barcode symbols on objects being moved along the assembly line, the conventional working range (i.e., 5–61 cm) is generally acceptable. In many applications where an increased working range is necessary, expensive and complex imaging arrangements having state-of-the-art automatic focus systems, such as zoom capabilities, are generally incorporated within or used in conjunction with barcode imagers to increase their working range. However, such imaging arrangements, besides being expensive, generally require constant maintenance. Therefore, when an application calls for imaging and decoding one-dimensional barcode symbols, these imaging arrangements do not compete well in the marketplace against laser-based barcode readers which have comparable or even greater working ranges, and generally are less expensive.

SUMMARY OF THE INVENTION

According to the above, there exists a need in the field of imaging for a non-complex imaging arrangement that can be incorporated within an image-based one-dimensional barcode imager for imaging a one-dimensional barcode symbol, or label, marking, picture, etc., at one of a plurality of focal planes traversing an optical axis and along an extended working range of the imaging arrangement.

Accordingly, an aspect of the present invention is to provide an imaging arrangement for imaging an optical code or target, such as a one-dimensional barcode symbol, or label, marking, picture, etc., at a plurality of focal planes traversing an optical axis and along an extended working range of the imaging arrangement.

Another aspect of the present invention is to provide an imaging arrangement for imaging an optical code or target, such as a one-dimensional barcode symbol, or label, marking, picture, etc., having an extended working range comparable to or even greater than conventional laser-based barcode readers and image-based barcode imagers.

Another aspect of the present invention is to provide an image-based barcode imager incorporating a non-complex imaging arrangement and having an extended working range comparable to or even greater than conventional laser-based barcode readers and image-based barcode imagers.

The imaging arrangement and barcode imager of the present invention achieve these and other aspects by providing an extended working range (i.e., greater than 61 cm or 24 inches) of approximately 5–102 cm (~2–40 inches) compared to a typical working range of approximately 5–61 cm (~2–24 inches) for conventional barcode imagers. The imaging arrangement and image-based barcode imager of the present invention do not require complex automatic-focusing systems. As such, the performance of the image-based one-dimensional barcode imager of the present invention in imaging and decoding one-dimensional barcode symbols (and in imaging and processing labels, markings, pictures, etc.) is comparable to or even greater than conventional laser-based barcode readers and image-based barcode imagers.

Specifically, in accordance with the present invention, three imaging arrangement embodiments are provided. In two of the embodiments a moveable carrier housing at least one objective lens is provided and, in one additional embodiment, at least one stationary objective lens and additional optical elements are provided. Each embodiment includes at least one fixed image sensor array for imaging thereon the optical code or target. Each imaging arrangement provides an extended working range of approximately 5–102 cm.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
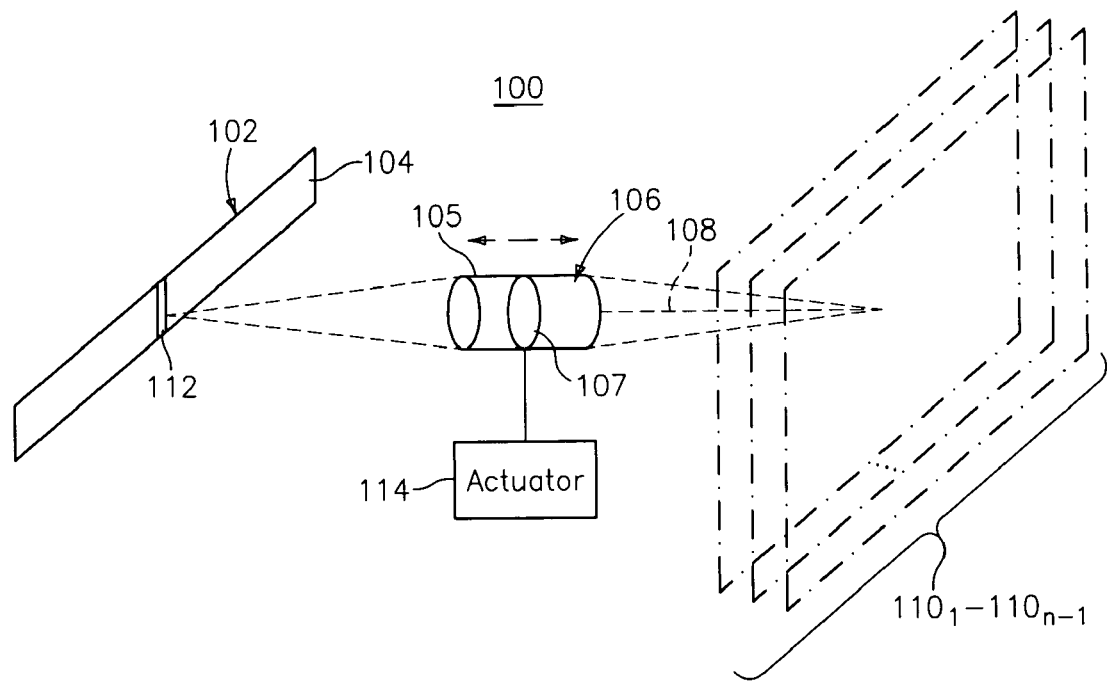
FIG. 1 is an illustration of an imaging arrangement in accordance with a first embodiment of the present invention.
Figure 2:
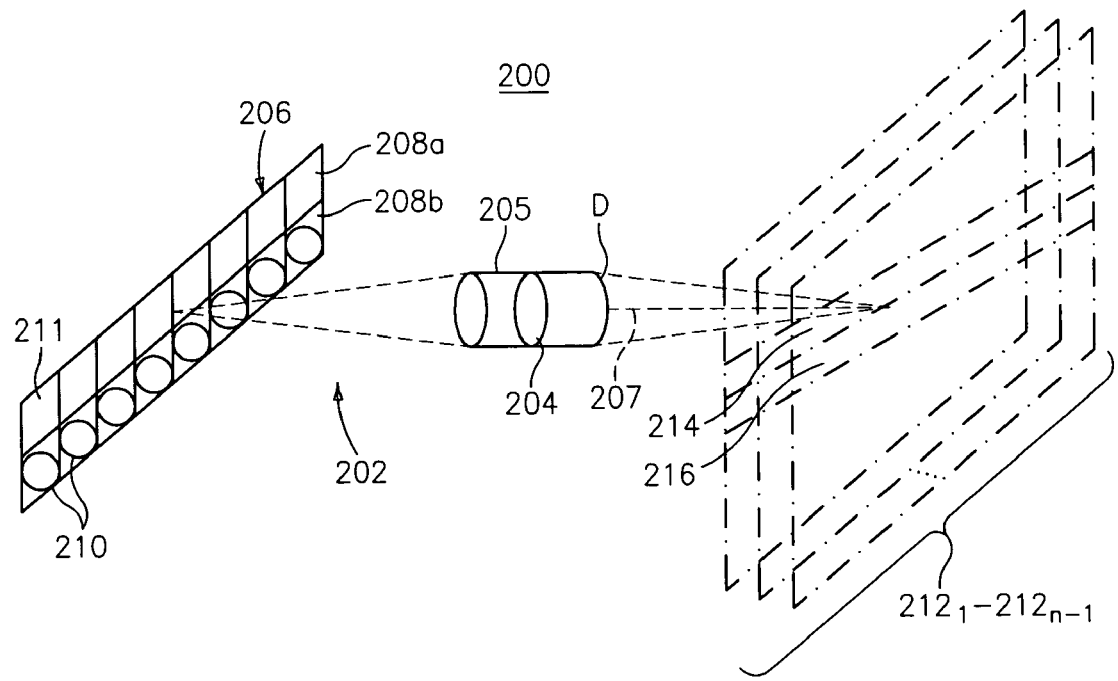
FIG. 2 is an illustration of an imaging arrangement in accordance with a second embodiment of the present invention.
Figure 3:
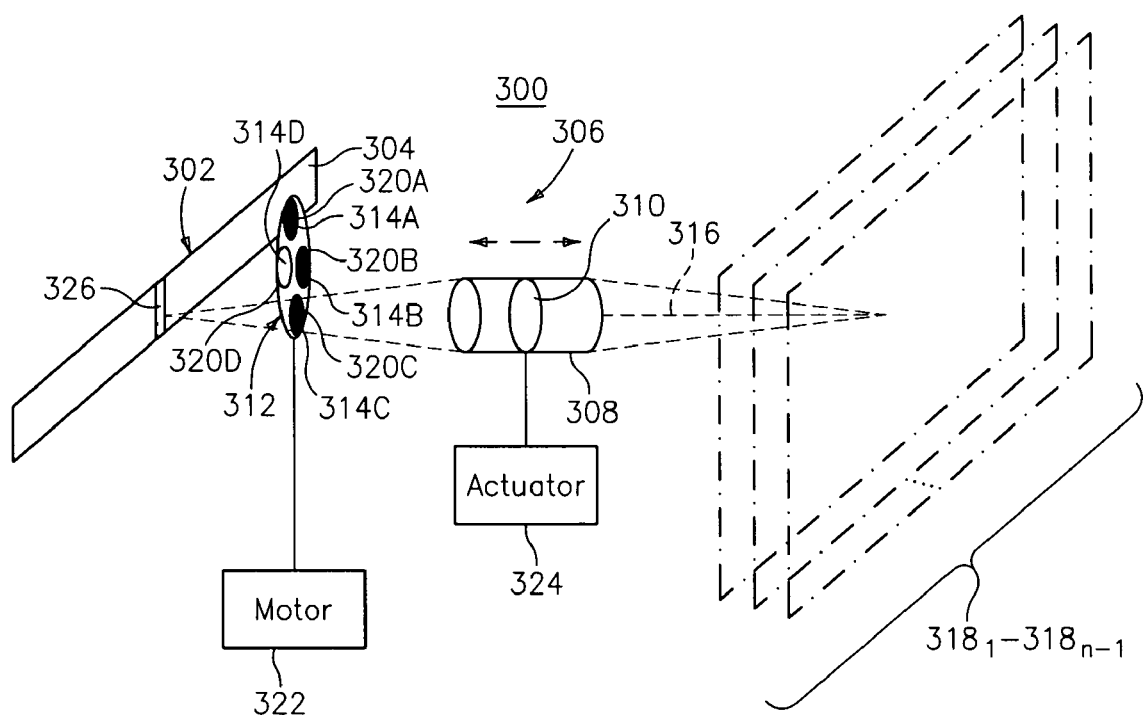
FIG. 3 is an illustration of an imaging arrangement in accordance with a third embodiment of the present invention.
Figure 4:
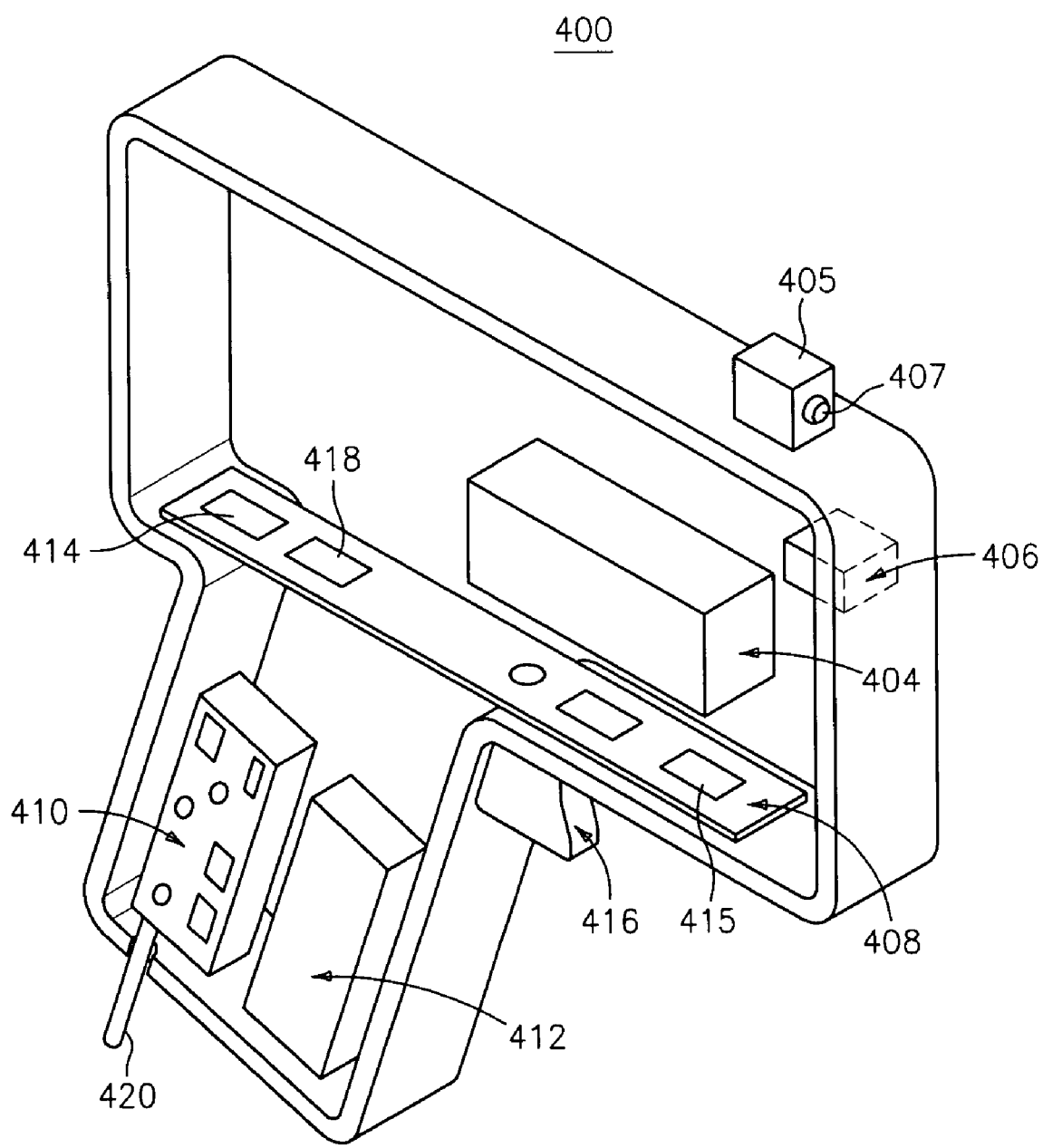
FIG. 4 is a phantom side view of a barcode imager in accordance with the present invention.

With reference to FIGS. 1–3, three different embodiments of an imaging arrangement according to the present invention are illustrated. FIG. 4 illustrates a barcode imager having one of the three different embodiments of the imaging arrangement incorporated therein for imaging and decoding a barcode symbol (or imaging and processing labels, markings, pictures, etc.). The imaging arrangements shown by FIGS. 1–3 and described herein are suitable for imaging various optical codes or targets, such as labels, markings, pictures, etc., and especially suitable for imaging one-dimensional barcode symbols, such as a Universal Product Code (UPC) barcode, and have an extended working range (i.e., greater than 61 cm or 24 inches) of approximately 5 cm (~2 inches) to 102 cm (~40 inches).

First Embodiment

With reference to FIG. 1, an imaging arrangement according to a first embodiment of the present invention is shown and designated generally by reference numeral 100. The imaging arrangement 100 includes an image sensor 102 having a one-dimensional, solid-state image sensor array 104, and a lens assembly 106. The lens assembly 106 includes a carrier 105 housing at least one objective lens 107.

The carrier 105 is moveable along an optical axis 108 of the imaging arrangement 100 by an actuator 114 for enabling the at least one objective lens 107 to focus an optical code or target, such as a one-dimensional barcode symbol, having a plane transverse to the optical axis 108 and correlated in space to one of a plurality of focal planes $110_1$–$110_{n-1}$, onto the image sensor 102. Movement of the carrier 105 is illustrated by the two arrows shown in FIG. 1. In the alternative, it is contemplated that only the at least one objective lens 107 within the carrier 105 of the lens assembly 106 is moved and the carrier 105 itself remains stationary.

As the carrier 105 of the lens assembly 106 is moved, the at least one objective lens 107 optimally focuses a different focal plane 110 of the plurality of focal planes $110_1$–$110_{n-1}$ onto the one-dimensional, solid-state image sensor array 104. The carrier 105 of the lens assembly 106 is moved until a focal plane (or a portion thereof) correlated in space to the plane transverse to the optical axis 108 is adequately or substantially focused onto the image sensor 102, and hence, an image of the optical code or target (or a portion thereof) is adequately or substantially focused onto the image sensor array 104.

In the case where the optical code or target is a one-dimensional barcode symbol, the optical code or target is determined to be adequately or substantially focused if a row of pixel data sensed by the image sensor array 104 and corresponding to the barcode symbol is properly and accurately decoded by a decoder of a barcode imager (see FIG. 4) or imaging system. The barcode imager outputs a beep sound or other indication, as known in the art, indicating the barcode symbol was successfully decoded.

If the barcode symbol is not properly and accurately decoded, the actuator 114 is actuated to obtain a different positional setting of the carrier 105 along the optical axis 108, in an effort to accurately or substantially focus the optical code or target onto the image sensor array 104. The actuator 114 is manually actuated by the operator, e.g., pressing a trigger button on a barcode imager (see FIG. 4), or automatically by a processor upon realizing the barcode symbol was not properly and accurately decoded.

Alternatively, if the barcode symbol is not properly and accurately decoded, the operator can manually change the distance between the lens assembly 106 and the optical code or target by moving the imaging arrangement 100, and thus image the optical code or target at a different focal plane 110, until a successful read is indicated.

In the case where the optical code or target is a label, marking, picture, etc., the optical code or target is determined to be adequately or substantially focused if a row of pixel data sensed by the image sensor array 104 and corresponding to the label, marking, picture, etc. is successfully processed in accordance with a particular application, such as an image processing and analysis application. If the barcode symbol is not successfully processed, the actuator 114 is actuated to obtain a different positional setting of the carrier 105 along the optical axis 108, in an effort to accurately or substantially focus the optical code or target onto the image sensor array 104. The actuator 114 is manually actuated by the operator, e.g., pressing a trigger button on a barcode imager (see FIG. 4), or automatically by a processor upon realizing the barcode symbol was not successfully processed.

Alternatively, if the optical code or target is not successfully processed, the operator can manually change the distance between the lens assembly 106 and the optical code or target by moving the imaging arrangement 100, and thus image the optical code or target at a different focal plane 110, until the imaged optical code or target is successfully processed.

It is provided that the label, marking, picture, etc. is generally larger in size, e.g., two-dimensional, than the one-dimensional image sensor array 104. Accordingly, prior to initiating the processing of the row of pixel data corresponding to the label, marking, picture, etc., additional rows of pixel data are obtained corresponding to different portions of the label, marking, picture, etc. The additional rows of pixel data are obtained by imaging the label, marking, picture, etc. using a barcode imager (see FIG. 4) having the imaging arrangement 100 and operating in a continuous imaging mode and by manually moving the barcode imager in a top-down or bottom-up manner. As the barcode imager is moved, a plurality of rows of pixel data corresponding to the label, marking, picture, etc. are obtained.

Each row of pixel data obtained during the continuous imaging mode and corresponding to a different portion of the label, marking, picture, etc. is stored within a memory until the entire (or sufficient portion) of the label, marking, picture, etc. is imaged. The stored rows of pixel data are then processed by a processor, for example, by mapping or joining the various rows of stored pixel data to create the imaged label, marking, picture, etc. and then processing the mapped pixel data. A similar procedure is performed for imaging and decoding two-dimensional barcode symbols, such as barcode symbols of the PDF417 symbology, using the imaging arrangement 100.

A focal plane at which the optical code or target can be properly and accurately decoded or successfully processed at a given position of the carrier 105 (or the at least one objective lens 107) belongs to a total set of focal planes of the plurality of focal planes $110_1$–$110_{n-1}$. Each focal plane belonging to the total set of focal planes adequately or substantially focuses the optical code or target onto the image sensor array 104. Therefore, there is not one particular focal plane which adequately or substantially focuses the optical code or target onto the image sensor array 104; there is, however, one particular focal plane which optimally focuses the optical code or target onto the image sensor array 104 referred to herein as the optimal focal plane.

When the optical code or target is optimally focused onto the image sensor array 104, the plane of the optical code or target transverse to the optical axis 108 is correlated in space to the optimal focal plane. However, a set of focal planes distally located from the optimal focal plane and a set of focal planes proximally located from the optimal focal plane, also provide an image of the optical code or target onto the image sensor 102 which is adequately or substantially focused for decoding and/or image processing and analysis. Both distal and proximal sets of focal planes comprise the total set of focal planes.

The plane of the optical code or target transverse to the optical axis 108 does not need to be correlated in space to the optimal focal plane in order for the optical code or target to be successfully decoded and/or processed; it just needs to be correlated to a focal plane of the total set of focal planes. If the plane of the optical code or target is not correlated in space to a focal plane of the total set of focal planes, the optical code or target would probably not be successfully decoded and/or processed. As such, the carrier 105 (or imaging arrangement) would need to be moved, in order for the plane of the optical code or target to be correlated in space to a focal plane of the total set of focal planes.

The focal planes are preferably two-dimensional rectangular planes, however, it is contemplated that the lens assembly 106 can include optics for creating and focusing onto the image sensor 102 three-dimensional focal planes, and/or focal planes having other types of geometric shapes, e.g., elliptical, circular, triangular, etc.

It is further contemplated that the optics create and focus focal planes (or portions thereof) having a slightly larger dimension or area than the image sensor array 104. For example, if the image sensor array 104 has a dimension of 1×1024, i.e., one pixel row, each focal plane 110 has a dimension of 3×1024, such that at least a portion of the image corresponding to the focal plane 110 overlays the pixel row of the image sensor array 104.

The image sensor 102 includes electronics (not shown) for outputting the row of pixel data corresponding to the image impinging upon the image sensor array 104. The image sensor array 104 includes a row of pixels 112 upon which the image is impinged upon or focused. Pixel data corresponding to each pixel 112 is outputted by the image sensor 102 for decoding and/or image processing and analysis. In the case of a barcode imager as shown in FIG. 4, the pixel data from all the pixels 112 is transmitted to a decoder for decoding thereof as known in the art.

The image sensor 102 is preferably a 1×1024 image sensor, i.e., an image sensor having one row of 1024 pixels and an imaging resolution of 1×1024, and characterized as a one-dimensional image sensor. The image sensor 102 provides superior resolution of the optical code or target whose transverse plane is correlated in space to one of the plurality of focal planes $110_1$–$110_{n-1}$.

The at least one objective lens 107 of the lens assembly 106 is a conventional objective lens. The carrier 105 (or, in the alternative, the at least one objective lens 107) is preferably moveable in the range of 0–100 μm by the actuator 114 for changing the set of focal planes adequately or substantially focused on the image sensor array 104. The actuator 114 may be an actuator as described in co-pending patent application assigned U.S. application Ser. No. 10/425, 344 filed on Apr. 29, 2003, the contents of which are hereby incorporated by reference in their entirety. Other types of actuators known in the art are contemplated for use in moving the lens assembly 106 along the optical axis 108.

The imaging arrangement 100 illustrated by FIG. 1 has a working range in the range of approximately 5 cm (~2 inches) to 102 cm (~40 inches). The working range is the distance from the end of the carrier 105 opposite the image sensor 102 to the farthest point in space the imaging arrangement 100 can adequately or substantially focus the optical code or target. In an imaging arrangement where only the at least one objective lens 107 is moved, the working range is the distance from the at least one objective lens 107 to the farthest point in space the imaging arrangement can adequately or substantially focus the optical code or target.

The working range is comparable to or greater than the working range of conventional image-based barcode imagers and laser-based barcode readers. As described below with reference to FIG. 4, the imaging arrangement 100 when incorporated within a barcode imager, provides an image-based, one-dimensional barcode imager having an extended working range (i.e., greater than 61 cm or 24 inches) of approximately 5 cm (~2 inches) to 102 cm (~40 inches).

Second Embodiment

FIG. 2 illustrates another embodiment of an imaging arrangement in accordance with the present invention and designated generally by reference numeral 200. In this embodiment, a lens assembly 202 includes at least one objective lens 204. The lens assembly 202 includes a carrier 205 housing the at least one objective lens 204. The carrier 205 is fixed at a predetermined distance with respect to an image sensor 206, and positioned along the optical axis 207 of the imaging arrangement 200. This embodiment does not have any moveable components.

The image sensor 206 is a two-dimensional image sensor 202, and preferably, a 2×1024 image sensor 202. That is, the image sensor 206 includes two one-dimensional image sensor arrays 208a, 208b each having one pixel row. In an alternate embodiment, the imaging arrangement 200 includes two one-dimensional image sensors as image sensor 102 which are stacked to resemble one two-dimensional image sensor.

The lens assembly 202 further includes optical elements 210 overlaying selective pixels 211 of the image sensor 206. The optical elements 210 are selected from the group consisting of glass, lens, holographic optical elements, plastic, and other transparent materials. Each optical elements 210 may have the same or different, predetermined optical characteristics than the other optical elements 210.

In a preferred embodiment, as shown by FIG. 2, the pixels 211 of only one image sensor array 208b are overlaid with the optical elements 210 (represented by the circles). In an alternate embodiment, every other pixel 211 of each image sensor array 208 is overlaid with the optical elements 210 and in a manner where only one pixel 211 of each column of pixels of the image sensor 206 is overlaid with the optical elements 210.

The stationary lens assembly 202 which includes the at least one objective lens 204 and the optical elements 210 focuses an optical code or target, such as a one-dimensional barcode symbol, having a plane transverse to the optical axis 207 and correlated in space to one of a plurality of focal planes $212_1$–$212_{n-1}$, onto the two one-dimensional image sensor arrays 208a, 208b of the image sensor 206.

Specifically, the lens assembly 202 focuses an image corresponding to a top row 214 of the optical code or target onto the top image sensor array 208a, and focuses an image corresponding to a bottom row 216 of the optical code or target onto the bottom image sensor array 208b. Since the pixels 211 of the bottom row 216 of the image sensor 206 are overlaid with the optical elements 210 of the lens assembly 202, the image focused on the bottom image sensor array 208b has a different focus quality than the image focused on the top image sensor array 208a.

Depending on the distance of the optical code or target with respect to the components of the lens assembly 202, one image corresponding to the optical code or target will have a sharper focus quality than the other image corresponding to the optical code or target. A set of programmable instructions may be executed by a processor for determining which image corresponding to the optical code or target is adequately or substantially focused, i.e., has the sharper focus quality, by analyzing the corresponding pixel data of each image and outputted by each image sensor array 208.

The pixel data may be analyzed in accordance with several characteristics, such as intensity, clarity, etc., for determining focus quality as known in the art. The pixel data corresponding to the image which has a sharper focus quality is then transmitted to a decoder for decoding and/or to the processor (or another processor) for image processing and analysis.

In the alternative, in the case where the optical code or target is a one-dimensional barcode symbol, the optical code or target is determined to be adequately or substantially focused if a row of pixel data outputted by one of the image sensor arrays 208a, 208b and corresponding to the barcode symbol is properly and accurately decoded by a decoder of a barcode imager (see FIG. 4) or imaging system. The pixel data corresponding to the top image sensor array 208a is first transmitted to the decoder, and if properly and accurately decoded, the decoding process is completed and the barcode imager outputs a beep sound or other indication, as known in the art, indicating the barcode symbol was successfully decoded.

If a misread or no read occurs, the pixel data corresponding to the bottom image sensor array 208b is transmitted to the decoder, and if properly and accurately decoded, the decoding process is completed and the barcode imager indicates the barcode symbol was successfully decoded. If the barcode symbol is not properly and accurately decoded at this point, the operator can change the distance between the lens assembly 202 and the optical code or target, and thus image the optical code or target at a different focal plane 212, until a successful read is indicated.

In the case where the optical code or target is a label, marking, picture, etc., the optical code or target is determined to be adequately or substantially focused if a row of pixel data sensed by one of the image sensor arrays 208a, 208b and corresponding to the label, marking, picture, etc. is successfully processed in accordance with a particular application, such as an image processing and analysis application. If the optical code or target is not successfully processed, the operator can manually change the distance between the lens assembly 202 and the optical code or target by moving the imaging arrangement 200, and thus image the optical code or target at a different focal plane 212, until the imaged optical code or target is successfully processed.

It is provided that the label, marking, picture, etc. is generally larger in size than the one-dimensional image sensor arrays 208a, 208b. Accordingly, prior to initiating the processing of the row of pixel data corresponding to the label, marking, picture, etc., additional rows of pixel data are obtained corresponding to different portions of the label, marking, picture, etc. The additional rows of pixel data are obtained by imaging the label, marking, picture, etc. using a barcode imager (see FIG. 4) having the imaging arrangement 200 and operating in a continuous imaging mode and by manually moving the barcode imager in a top-down or bottom-up manner. As the barcode imager is moved, a plurality of rows of pixel data corresponding to the label, marking, picture, etc. are obtained.

Each row of pixel data obtained during the continuous imaging mode and corresponding to a different portion of the label, marking, picture, etc. is stored within a memory until the entire (or sufficient portion) of the label, marking, picture, etc. is imaged. The stored rows of pixel data are then processed by a processor, for example, by mapping or joining the various rows of stored pixel data to create the imaged label, marking, picture, etc. and then processing the mapped pixel data. A similar procedure is performed for imaging and decoding two-dimensional barcode symbols, such as barcode symbols of the PDF417 symbology, using the imaging arrangement 200.

Due to the presence of the optical elements 210, the bottom image sensor array 208b images a different set of focal planes, e.g., $212_1$–$212_{50}$, of the plurality of focal planes $212_1$–$212_{n-1}$ than a set of focal planes, e.g., $212_{45}$–$212_{n-1}$, imaged by the top image sensor array 208a. The two sets may or may not have overlapping focal planes, in accordance with the arrangement and selection of the at least one objective lens 204 and the optical elements 210. Therefore, in contrast to the first embodiment, this embodiment can image the optical code or target at a greater number of focal planes at a given position of the at least one objective lens 204.

Electronics associated with the image sensor 206 determine which image sensor array 208 adequately or substantially focuses the image corresponding to the optical code or target. Hence, in effect, the electronics determine which image sensor array 208 images the set of focal planes which include a focal plane 212 which optimally focuses the optical code or target onto the image sensor 206, i.e., an optimal focal plane. This is because the optimal focal plane belongs to the set of focal planes which includes at least one focal plane 212, besides the optimal focal plane, which adequately or substantially focuses the image corresponding to the optical code or target.

It is noted, however, as described for the first embodiment, that a plane of the optical code or target transverse to the optical axis 207 may not be exactly correlated in space to the optimal focal plane in order for the corresponding image to be adequately or substantially focused. It is further noted that the electronics may determine that the optimal focal plane is focused onto both image sensor arrays 208a, 208b. For example, in the above example of the two sets of focal planes, the optimal focal plane may be focal plane $212_{47}$. In this case, the electronics can select the pixel data corresponding to either the top or bottom image sensor array 208 for decoding and/or image processing and analysis.

When the optical code or target is optimally focused onto one or both of the image sensor arrays 208a, 208b, the plane of the optical code or target transverse to the optical axis 207 is correlated in space to the optimal focal plane. However, as described above for the first embodiment, a set of focal planes distally located from the optimal focal plane and a set of focal planes proximally located from the optimal focal plane, also provide an image of the optical code or target onto the image sensor 206 which is adequately or substantially focused for decoding and/or image processing and analysis.

The plane of the optical code or target transverse to the optical axis 207 does not need to be correlated in space to the optimal focal plane in order for the optical code or target to be successfully decoded and/or processed; it just needs to be correlated to a focal plane of a set of focal planes adequately or substantially focused onto the image sensor 206. For example, in the above example, if the optimal focal plane is focal plane $212_{36}$ (according to the distance between the image sensor 206 and the optical code or target) and the plane of the optical code or target is correlated in space to focal plane $212_{30}$, the optical code or target is still adequately or substantially focused for decoding and/or image processing or analysis.

If the plane of the optical code or target is not correlated in space to a focal plane of the set of focal planes adequately or substantially focused onto either the top or bottom image sensor array 208 of the image sensor 206, the optical code or target would probably not be successfully decoded and/or processed. As such, the imaging arrangement 200 would need to be moved, in order for the plane of the optical code or target to be correlated in space to a focal plane of the set of focal planes adequately or substantially focused onto the image sensor 206.

As in the first embodiment, the focal planes are preferably two-dimensional rectangular planes, however, it is contemplated that the lens assembly 202 can include optics for creating and focusing onto the image sensor 206 three-dimensional focal planes, and/or focal planes having other types of geometric shapes, e.g., elliptical, circular, triangular, etc.

It is further contemplated that the two rows 214, 216 created and focused by the optics of the lens assembly 202 have a slightly larger dimension or area than the area of each image sensor array 208. For example, if each image sensor array 208 has a dimension of 1×1024, i.e., one pixel row, each of the two rows 214, 216 has a dimension of 3×1024, such that at least a portion of the image corresponding to each of the two rows 214, 216 overlays the pixel row of the image sensor array 208.

The electronics associated with the image sensor 206 output the pixel data corresponding to the image impinging upon the image sensor arrays 208a, 208b. The image is impinged upon or focused onto the pixels 211. Pixel data corresponding to each pixel 211 is outputted by the image sensor 206 for decoding and/or image processing and analysis. In the case of a barcode imager as shown in FIG. 4, the pixel data from all the pixels 211 is transmitted to a decoder for decoding thereof as known in the art.

The at least one objective lens 204 of the lens assembly 202 is a conventional objective lens. The image sensor 206 is preferably a 2×1024 image sensor, i.e., an image sensor having two rows of 1024 pixels and an imaging resolution of 2×1024, and characterized as a two-dimensional image sensor. The image sensor 206 provides superior resolution of the optical code or target whose transverse plane is correlated in space to one of the plurality of focal planes $212_1$–$212_{n-1}$.

The imaging arrangement 200 illustrated by FIG. 2 has a working range in the range of approximately 5 cm (~2 inches) to 102 cm (~40 inches). The working range is the distance from the end of the lens assembly 202 referenced by the letter "D" to the farthest point in space the imaging arrangement 200 can adequately or substantially focus the optical code or target. The working range is comparable to or greater than the working range of conventional image-based barcode imagers and laser-based barcode readers. As described below with reference to FIG. 4, the imaging arrangement 200 when incorporated within a barcode imager (see FIG. 4), provides an image-based, one-dimensional barcode imager having an extended working range (i.e., greater than 61 cm or 24 inches) of approximately 5 cm (~2 inches) to 102 cm (~40 inches).

Third Embodiment

With reference to FIG. 3, an imaging arrangement according to a third embodiment of the present invention is shown and designated generally by reference numeral 300. The imaging arrangement 300 includes an image sensor 302 having a one-dimensional, solid-state image sensor array 304, and a lens assembly 306. The lens assembly 306 includes a first carrier 308 housing at least one objective lens 310 and a second carrier 312 having a plurality of segments 314A–D. This embodiment is similar to the first embodiment with the addition of the second carrier 312.

The first carrier 308 is moveable along an optical axis 316 of the imaging arrangement 300 for enabling the at least one objective lens 310 to focus an optical code or target, such as a one-dimensional barcode symbol, through one of the plurality of segments 314A–D onto the image sensor array 304. The optical code or target has a plane transverse to the optical axis 316 and correlated in space to one of a plurality of focal planes $318_1$–$318_{n-1}$.

Movement of the first carrier 308 is illustrated by the two arrows shown in FIG. 3. In the alternative, it is contemplated that only the at least one objective lens 310 within the first carrier 308 is moved and the carrier 308 itself remains stationary.

Each segment of the plurality of segments 314A–D includes one of a plurality of optical elements 320A–D for further focusing the optical code or target onto the image sensor array 304 and increasing the focus quality of the corresponding image impinged onto the image sensor array 304. The plurality of optical elements 320A–D carried by the second carrier 312 is selected from the group consisting of glass, lens, holographic optical elements, plastic, and other transparent materials. Each optical element 320 has different, predetermined optical characteristics than the other optical elements 320. In a preferred embodiment, one segment 314D of the plurality of segments 314A–D does not have an optical element 320, i.e., the segment 314D is open.

The individual optical elements 320A–D of the second carrier 312 are moveable sequentially in and out of the optical axis 316 by rotating the carrier 312 (clockwise and/or counter-clockwise) by activating a motor 322, such as a servo-motor, operatively connected to the carrier 312. The first carrier 308 (or the at least one objective lens 310) can be simultaneously moved along the optical axis 316 by an actuator 324, or it can be kept stationary, as the second carrier 312 is moved. Each combination of optical element 320 and position of the first carrier 308 (or the at least one objective lens 310) optimally focuses a different focal plane of the plurality of focal planes $318_1$–$318_{n-1}$ onto the one-dimensional, solid-state image sensor array 304. It is contemplated that the second carrier 312 can have other geometric shapes, such as rectangular.

At least one of the first and second carriers 308, 312 is moved until a focal plane (or a portion thereof) correlated in space to the plane transverse to the optical axis 316 is adequately or substantially focused onto the image sensor 302, and hence, an image of the optical code or target (or a portion thereof) is adequately or substantially focused onto the image sensor array 304.

In the case where the optical code or target is a one-dimensional barcode symbol, the optical code or target is determined to be adequately or substantially focused if a row of pixel data sensed by the image sensor array 304 and corresponding to the barcode symbol is properly and accurately decoded by a decoder of a barcode imager (see FIG. 4) or imaging system. The barcode imager outputs a beep sound or other indication, as known in the art, indicating the barcode symbol was successfully decoded.

If the barcode symbol is not properly and accurately decoded, the motor 322 and/or the actuator 324 are actuated to position a different segment 314 along the optical axis 316 and/or to obtain a different positional setting of the first carrier 308, in an effort to accurately or substantially focus the optical code or target onto the image sensor array 304. The motor 322 and/or actuator 324 are manually actuated by the operator, e.g., pressing a trigger button on a barcode imager, or automatically by a processor upon realizing the barcode symbol was not properly and accurately decoded.

Alternatively, if the barcode symbol is not properly and accurately decoded, the operator can manually change the distance between the various components of the lens assembly 306 and the optical code or target by moving the imaging arrangement 300, and thus image the optical code or target at a different focal plane 318, until a successful read is indicated.

In the case where the optical code or target is a label, marking, picture, etc., the optical code or target is determined to be adequately or substantially focused if a row of pixel data sensed by the image sensor array 304 and corresponding to the label, marking, picture, etc. is successfully processed in accordance with a particular application, such as an image processing and analysis application. If the optical code or target is not successfully processed, the motor 322 and/or the actuator 324 are actuated to position a different segment 314 along the optical axis 316 and/or to obtain a different positional setting of the first carrier 308, in an effort to accurately or substantially focus the optical code or target onto the image sensor array 304. The motor 322 and/or actuator 324 are manually actuated by the operator, e.g., pressing a trigger button on a barcode imager, or automatically by a processor upon realizing the barcode symbol was not successfully processed.

Alternatively, if the optical code or target is not successfully processed, the operator can manually change the distance between the various components of the lens assembly 306 and the optical code or target by moving the imaging arrangement 300, and thus image the optical code or target at a different focal plane 318, until the imaged optical code or target is successfully processed.

It is provided that the label, marking, picture, etc. is generally larger in size, e.g., two-dimensional, than the one-dimensional image sensor array 304. Accordingly, prior to initiating the processing of the row of pixel data corresponding to the label, marking, picture, etc., additional rows of pixel data are obtained corresponding to different portions of the label, marking, picture, etc. The additional rows of pixel data are obtained by imaging the label, marking, picture, etc. using a barcode imager (see FIG. 4) having the imaging arrangement 300 and operating in a continuous imaging mode and by manually moving the barcode imager in a top-down or bottom-up manner. As the barcode imager is moved, a plurality of rows of pixel data corresponding to the label, marking, picture, etc. are obtained.

Each row of pixel data obtained during the continuous imaging mode and corresponding to a different portion of the label, marking, picture, etc. is stored within a memory until the entire (or sufficient portion) of the label, marking, picture, etc. is imaged. The stored rows of pixel data are then processed by a processor, for example, by mapping or joining the various rows of stored pixel data to create the imaged label, marking, picture, etc. and then processing the mapped pixel data. A similar procedure is performed for imaging and decoding two-dimensional barcode symbols, such as barcode symbols of the PDF417 symbology, using the imaging arrangement 300.

A focal plane at which the optical code or target can be properly and accurately decoded or successfully processed at a given position of the various components of the lens assembly 306 belongs to a total set of focal planes of the plurality of focal planes $318_1$–$318_{n-1}$. Each focal plane belonging to the total set of focal planes adequately or substantially focuses the optical code or target onto the image sensor array 304. Therefore, there is not one particular focal plane which adequately or substantially focuses the optical code or target onto the image sensor array 304; there is, however, one particular focal plane which optimally focuses the optical code or target onto the image sensor array 304 referred to herein as the optimal focal plane.

When the optical code or target is optimally focused onto the image sensor array 304, the plane of the optical code or target transverse to the optical axis 316 is correlated in space to the optimal focal plane. However, a set of focal planes distally located from the optimal focal plane and a set of focal planes proximally located from the optimal focal plane, also provide an image of the optical code or target onto the image sensor 302 which is adequately or substantially focused for decoding and/or image processing and analysis. Both distal and proximal sets of focal planes comprise the total set of focal planes.

The plane of the optical code or target transverse to the optical axis 316 does not need to be correlated in space to the optimal focal plane in order for the optical code or target to be successfully decoded and/or processed; it just needs to be correlated to a focal plane of the total set of focal planes. If the plane of the optical code or target is not correlated in space to a focal plane of the total set of focal planes, the optical code or target would probably not be successfully decoded and/or processed. As such, the first carrier 308, the second carrier 312, and/or the imaging arrangement 300 would need to be moved, in order for the plane of the optical code or target to be correlated in space to a focal plane of the total set of focal planes.

As with the first and second embodiments, the focal planes are preferably two-dimensional rectangular planes, however, it is contemplated that the lens assembly 306 can include optics for creating and focusing onto the image sensor 302 three-dimensional focal planes, and/or focal planes having other types of geometric shapes, e.g., elliptical, circular, triangular, etc.

It is further contemplated that the optics create and focus focal planes (or portions thereof) having a slightly larger dimension or area than the image sensor array 304. For example, if the image sensor array 304 has a dimension of 1×1024, i.e., one pixel row, each focal plane 318 has a dimension of 3×1024, such that at least a portion of the image corresponding to the focal plane 318 overlays the pixel row of the image sensor array 304.

The image sensor 302 includes electronics (not shown) for outputting the pixel data corresponding to the image impinging upon the image sensor array 304. The image sensor array 304 includes pixels 326 upon which the image is impinged upon or focused. Pixel data corresponding to each pixel 326 is outputted by the image sensor 302 for decoding and/or image processing and analysis. In the case of a barcode imager as shown in FIG. 4, the pixel data from all the pixels 326 is transmitted to a decoder for decoding thereof as known in the art.

The image sensor 302 is preferably a 1×1024 image sensor, i.e., an image sensor having one row of 1024 pixels and an imaging resolution of 1×1024, and characterized as a one-dimensional image sensor. The image sensor 302 provides superior resolution of the optical code or target whose transverse plane is correlated in space to one of the plurality of focal planes $318_1$–$318_{n-1}$.

The at least one objective lens 310 of the lens assembly 306 is a conventional objective lens. The first carrier 308 (or, in the alternative, the at least one objective lens 310) is preferably moveable in the range of 0–100 μm by the actuator 324 for changing the set of focal planes adequately or substantially focused on the image sensor array 304. The actuator 324 may be an actuator as described in co-pending patent application assigned U.S. application Ser. No. 10/425,344 filed on Apr. 29, 2003, the contents of which are hereby incorporated by reference in their entirety. Other types of actuators known in the art are contemplated for use in moving the lens assembly 306 along the optical axis 316.

The imaging arrangement 300 illustrated by FIG. 3 has a working range in the range of approximately 5 cm (~2 inches) to 102 cm (~40 inches). The working range is the distance from the end of the first carrier 308 opposite the image sensor 302 to the farthest point in space the imaging arrangement 300 can adequately or substantially focus the optical code or target. In an imaging arrangement where only the at least one objective lens 310 is moved instead of the first carrier 308, the working range is the distance from the at least one objective lens 310 to the farthest point in space the imaging arrangement can adequately or substantially focus the optical code or target.

The working range is comparable to or greater than the working range of conventional image-based barcode imagers and laser-based barcode readers. As described below with reference to FIG. 4, the imaging arrangement 300 when incorporated within a barcode imager, provides an image-based, one-dimensional barcode imager having an extended working range (i.e., greater than 61 cm or 24 inches) of approximately 5 cm (~2 inches) to 102 cm (~40 inches).

For the first and third embodiments, it is contemplated to move the carrier 106, 308 (or the lens 107, 310) through every possible position and image the optical code or target from every position. The pixel data corresponding to each position are stored and after the optical code or target is imaged from every position, the pixel data from every position is compared to determine the optimum pixel data using a comparison algorithm. The optimum pixel data are the pixel data having the maximum intensity. The optimum pixel data are then decoded and/or processed. It is further contemplated to decode and/or process pixel data which does not correspond to the optimum pixel data.

Barcode Imager

The imaging arrangements of the first to third embodiments described above can be incorporated in a variety of imaging devices where an inexpensive, non-complex imaging arrangement providing an extended working range (i.e., greater than 61 cm or 24 inches) is advantageous. One such imaging device is an image-based, one-dimensional barcode imager as shown in FIG. 4 and designated generally by reference numeral 400.

The barcode imager 400 includes a handheld barcode imager 402 housing one of the imaging arrangements 404 described above, an illumination source 406 having at least one LED or other light generating device, an aiming source 405 having a laser diode 407 for aiming a laser beam at the optical code or target to be imaged, control circuitry 408, communication circuitry 410 and a battery 412 for wireless operation. Alternatively, the barcode imager 400 may be designed for non-wireless operation.

The control circuitry 408 includes a processor 414 for controlling the operation of the barcode imager 400, such as for actuating an image and decode process upon a user pressing a trigger button 416, actuating the actuator 114, 324 and motor 322, controlling the illumination source 406, the aiming source 405 and communication circuitry 410, for determining if an optical code or target is adequately or substantially focused, for operating the barcode imager 400 in the continuous imaging mode, for executing a set of programmable instructions for decoding the imaged optical code or target or controlling operation of a decoder 418 for decoding the imaged optical code or target, and for executing a set of programmable instructions for processing the imaged optical code or target. The decoder 418 can be external to the processor 414 as shown in FIG. 4 or resident within the processor 414.

The control circuitry 408 further includes a memory 415 for storing rows of pixel data as described above with reference to the three embodiments and operational instructions, such as the sets of programmable instructions for operating the barcode imager 400 in the continuous imaging mode, capable of being executed by the processor 414. The memory 415 can be external to the processor 414 as shown in FIG. 4 or resident within the processor 414.

The communication circuitry 410 includes an antenna 420 for outputting data indicative of the decoded and/or processed optical code or target to an external computing device, and for inputting data, such as data for changing at least one operational parameter of the barcode imager 402 as known in the art. The operational parameters can also be changed by imaging an optical code or target corresponding to at least one operational parameter and decoding and/or processing the imaged optical code or target, and subsequently changing the at least one operational parameter indicative of the decoded and/or processed optical code or target.

The working range of the barcode imager 400 is comparable to or greater than the working range of conventional image-based barcode imagers and laser-based barcode readers. The barcode imager 400 has an extended working range (i.e., greater than 61 cm or 24 inches) of approximately 5 cm (~2 inches) to 102 cm (~40 inches).

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An imaging arrangement for imaging an optical code or target at a plurality of focal planes comprising:
   an image sensor having first and second one-dimensional image sensor arrays, the first and second image sensor arrays each have one row of pixels for obtaining a respective row of pixel data corresponding to an image focused thereon; and
   a lens assembly having at least one objective lens, said at least one objective lens being positioned along a single optical axis of the imaging arrangement for focusing an image of the optical code or target at a substantially central longitudinal axis of the image sensor such that during an imaging operation, portions of the image are focused on the first and second image sensor arrays for obtaining two rows of pixel data, each row of pixel data corresponding to at least a portion of the optical code or target, wherein the lens assembly includes a plurality of optical elements for further focusing the image on at least one of the first and second one-dimensional image sensor arrays, and wherein the plurality of optical elements overlay at least a portion of at least one of the first and second one-dimensional image sensor arrays.

2. The imaging arrangement according to claim 1, wherein the optical code or target is selected from the group consisting of a barcode symbol, a label, a marking, and a picture.

3. The imaging arrangement according to claim 2, wherein the barcode symbol is one of a one-dimensional and a two-dimensional barcode symbol.

4. The imaging arrangement according to claim 1, wherein the imaging arrangement has a working range in the range of approximately 5 cm to 102 cm.

5. The imaging arrangement according to claim 1, wherein the lens assembly is stationary.

6. The imaging arrangement according to claim 1, wherein the plurality of optical elements are selected from the group consisting of glass, lens, holographic optical elements, plastic, and other transparent materials.

7. The imaging arrangement according to claim 6, wherein the plurality of optical elements overlay the entire row of pixels of the at least one one-dimensional image sensor array.

8. An imaging arrangement for imaging an optical code or target at a plurality of focal planes comprising:
   an image sensor having a one-dimensional image sensor array, the one-dimensional image sensor array having a row of pixels for obtaining a row of pixel data corresponding to an image focused thereon;
   a lens assembly having at least one objective lens, said at least one objective lens being positioned along a single optical axis of the imaging arrangement for focusing an image of the optical code or target at a substantially central longitudinal axis of the image sensor such that during an imaging operation, portions of the image are focused on the one-dimensional image sensor array for obtaining a row of pixel data corresponding to at least a portion of the optical code or target; and
   a plurality of optical elements overlaying at least a portion of the one-dimensional image sensor array.

9. The imaging arrangement according to claim 8, wherein the imaging arrangement has a working range in the range of approximately 5 cm to 102 cm.

10. The imaging arrangement according to claim 8, further comprising a carrier housing the at least one objective lens.

11. An imaging arrangement for imaging an optical code or target at a plurality of focal planes comprising:
    a one-dimensional image sensor array having at least one row of pixels for obtaining a row of pixel data corresponding to an image focused thereon; and
    a lens assembly having at least one objective lens, the at least one objective lens being positioned along an optical axis of the imaging arrangement, and a carrier having a plurality of optical elements configured for positioning at least one of the plurality of optical elements along the optical axis for focusing an image of the optical code or target on the one-dimensional image sensor array for obtaining a row of pixel data corresponding to at least a portion of the optical code or target.

12. The imaging arrangement according to claim 11, wherein the imaging arrangement has a working range in the range of approximately 5 cm to 102 cm.

13. The imaging arrangement according to claim 11, wherein the plurality of optical elements are selected from the group consisting of glass, lens, holographic optical elements, plastic, and other transparent materials.

14. The imaging arrangement according to claim 10, wherein the carrier is moved in the range of 0–100 μm by the actuator.

15. An imaging arrangement for imaging an optical code or target at a plurality of focal planes comprising:
    a one-dimensional image sensor array having one row of pixels for obtaining one row of pixel data corresponding to an image focused thereon; and
    a lens assembly having at least one objective lens positioned along an optical axis of the imaging arrangement for focusing an image of the optical code or target on the one-dimensional image sensor array for obtaining a row of pixel data corresponding to at least a portion of the optical code or target, wherein a plane of the optical code or target is correlated in space to at least one of the plurality of focal planes;
    an actuator operatively coupled to a carrier housing the at least one objective lens for moving the at least one objective lens along the optical axis;
    a motor operatively coupled to another carrier having the plurality of optical elements, wherein the actuator and motor can be operated simultaneously and non-simultaneously for moving the carriers simultaneously and non-simultaneously, respectively, for focusing the image on the one-dimensional image sensor array.

16. The imaging arrangement according to claim 15, wherein the imaging arrangement has a working range in the range of approximately 5 cm to 102 cm.

17. The imaging arrangement according to claim 15, wherein the plurality of optical elements are selected from the group consisting of glass, tens, holographic optical elements, plastic, and other transparent materials.

18. A barcode imager for imaging an optical code or target at a plurality of focal planes comprising:
    means for initiating an imaging operation for imaging the optical code or target at at least one of the plurality of focal planes;
    an imaging arrangement comprising:
       a one-dimensional image sensor array having a row of pixels for obtaining a row of pixel data corresponding to an image of the optical code or target during the imaging operation; and
       a lens assembly having at least one objective lens, said at least one objective lens being positioned along a single optical axis of the imaging arrangement for focusing the image at a substantially central longitudinal axis of the image sensor array, wherein the lens assembly includes a plurality of optical elements for further focusing the image on the at least one one-dimensional image sensor array; and
    a carrier having a plurality of segments, wherein each of the plurality of optical elements is provided at a corresponding one of the plurality of segments.

19. The barcode imager according to claim 18, wherein the optical code or target is selected from the group consisting of a barcode symbol, a label, a marking, and a picture.

20. The barcode imager according to claim 19, wherein the barcode symbol is one of a one-dimensional and a two-dimensional barcode symbol.

21. The barcode imager according to claim 18, wherein the imaging arrangement has a working range in the range of approximately 5 cm to 102 cm.

22. The barcode imager according to claim 18, wherein the imaging arrangement further comprises an actuator operatively coupled to a carrier housing the at least one objective lens for moving the carrier along the optical axis.

23. The barcode imager according to claim 22, wherein the carrier is moved in the range of 0–100 μm by the actuator.

24. The barcode imager according to claim 18, wherein the plurality of optical elements are selected from the group consisting of glass, lens, holographic optical elements, plastic, and other transparent materials.

25. The barcode imager according to claim 18, wherein one of the plurality of segments is an open segment and does not include an optical element, and wherein the imaging arrangement further comprises a motor operatively coupled to the carrier for positioning the open segment or one of the plurality of optical elements along the optical axis.

26. The barcode imager according to claim 18, wherein the imaging arrangement further comprises:
   an actuator operatively coupled to another carrier housing the at least one objective lens for moving the first carrier along the optical axis; and
   a motor operatively coupled to the carrier having the plurality of optical elements, wherein the actuator and motor can be operated simultaneously and non-simultaneously for moving the carriers simultaneously and non-simultaneously, respectively, for further focusing the image on the one-dimensional image sensor array.

27. The barcode imager according to claim 18, further comprising:
   a memory for storing rows of pixel data corresponding to different portions of the optical code or target; and
   a processor for processing the stored rows of pixel data.

28. The barcode imager according to claim 18, wherein the at least one of the plurality of focal planes is an optimal focal plane.

29. The barcode imager according to claim 18, wherein the at least one of the plurality of focal planes is at least one focal plane proximally or distally located from an optimal focal plane.

30. The barcode imager according to claim 18, further comprising means for focusing different sets of the plurality of focal planes on the one-dimensional imager sensor array.

31. The barcode imager according to claim 30, wherein the means for focusing different sets of the plurality of focal planes includes an actuator operatively coupled to another carrier housing the at least one objective lens for moving this carrier along the optical axis.

32. The barcode imager according to claim 30, wherein the means for focusing different sets of the plurality of focal planes includes a motor operatively coupled to the carrier having the plurality of optical elements, and wherein said motor is capable of positioning each of the plurality of optical elements along the optical axis.

33. A method for imaging an optical code or target at a plurality of focal planes using an imaging arrangement, said method comprising the steps of:
   initiating an imaging operation for imaging the optical code or target at at least one of the plurality of focal planes onto an image sensor having first and second one-dimensional image sensor arrays via at least one objective lens positioned along a single optical axis of the imaging arrangement;
   obtaining two rows of pixel data, each row of pixel data corresponding to the optical code or target during the imaging operation; and
   positioning at least one optical element between the at least one objective lens and the at least one one-dimensional image sensor array, wherein the at least one optical element overlays at least a portion of at least one of the one-dimensional image sensor arrays.

34. The method according to claim 33, further comprising the steps of:
   determining whether at least one row of pixel data can be decoded and/or processed; and
   decoding and/or processing a row of pixel data if it is determined that at least one row of pixel data can be decoded and/or processed.

35. The method according to claim 34, further comprising the steps of:
   moving the at least one objective lens if it is determined that at least one row of pixel data cannot be decoded and/or processed; and
   repeating the initiating, obtaining and determining steps, and one of the decoding and moving steps, until the at least one row of pixel data is decoded and/or processed.

36. The method according to claim 33, further comprising the steps of:
   moving the at least one objective lens;
   repeating the initiating, obtaining and moving steps, until the at least one objective lens has been moved through every position; and
   decoding and/or processing at least one row of obtained pixel data.

37. The method according to claim 33, further comprising the steps of:
   storing the row of pixel data;
   repeating the initiating and storing steps until a plurality of rows of pixel data corresponding to the optical code or target are stored; and
   decoding and/or processing the plurality of stored rows of pixel data.

38. The method according to claim 33, wherein the optical code or target is selected from the group consisting of a barcode symbol, a label, a marking, and a picture.

39. The method according to claim 38, wherein the barcode symbol is one of a one-dimensional and a two-dimensional barcode symbol.

40. The method according to claim 33, wherein the at least one optical element is selected from the group consisting of glass, lens, holographic optical elements, plastic, and other transparent materials.

41. An imaging arrangement for imaging an optical code or target at a plurality of focal planes comprising:
   at least one one-dimensional image sensor array each having at least one row of pixels for obtaining at least one row of pixel data corresponding to an image focused thereon;
   a lens assembly having at least one objective lens positioned along an optical axis of the imaging arrangement for focusing an image of the optical code or target on the at least one one-dimensional image sensor array for obtaining one of a row or two rows of pixel data corresponding to at least a portion of the optical code or target, wherein a plane of the optical code or target is correlated in space to at least one of the plurality of focal planes, wherein the lens assembly includes a plurality of optical elements for further focusing the image on the at least one one-dimensional image sensor array; and
   a carrier having a plurality of segments, wherein each of the plurality of optical elements is provided at a corresponding one of the plurality of segments.

42. The imaging arrangement according to claim 41, wherein one of the plurality of segments is an open segment and does not include an optical element, and further comprising a motor operatively coupled to the carrier for positioning the open segment or one of the plurality of optical elements along the optical axis.

43. The imaging arrangement according to claim 41, further comprising:
   an actuator operatively coupled to a first carrier housing the at least one objective lens for moving the first carrier along the optical axis; and a motor operatively coupled to a second carrier having a plurality of optical elements, wherein the actuator and motor can be operated simultaneously and non-simultaneously for moving the first carrier and the second carrier simultaneously and non-simultaneously, respectively, for further focusing the image on the at least one one-dimensional image sensor array.

44. A barcode imager for imaging an optical code or target at a plurality of focal planes comprising:
   means for initiating an imaging operation for imaging the optical code or target at at least one of the plurality of focal planes;
   an imaging arrangement comprising:
      an image sensor having at least one one-dimensional image sensor array having a row of pixels for obtaining pixel data corresponding to an image of the optical code or target during the imaging operation; and
      a lens assembly having at least one objective lens, said at least one objective lens being positioned along a single optical axis of the imaging arrangement for focusing the image a substantially central longitudinal axis of the image sensor such that, during the imaging operation for obtaining pixel data, a row of pixel data corresponds to at least a portion of the optical code or target; and
   means for focusing different sets of the plurality of focal planes on the at least one one-dimensional imager sensor array, wherein the means for focusing different sets of the plurality of focal planes includes a motor operatively coupled to a carrier having a plurality of optical elements, and wherein said motor is capable of positioning each of the plurality of optical elements along the optical axis.

45. The barcode imager according to claim 41, wherein the means for focusing different sets of the plurality of focal planes includes an actuator operatively coupled to a carrier housing the at least one objective lens for moving the carrier along the optical axis.

46. A barcode imager for imaging an optical code or target at a plurality of focal planes comprising:
   means for initiating an imaging operation for imaging the optical code or target at at least one of the plurality of focal planes; and
   an imaging arrangement comprising:
      an image sensor having first and second one-dimensional image sensor arrays, the first and second image sensor arrays each have a row of pixels for obtaining a respective row of pixel data corresponding to an image of the optical code or target during the imaging operation;
      a lens assembly having at least one objective lens, said at least one objective lens being positioned along a single optical axis of the imaging arrangement for focusing the image at a substantially central longitudinal axis of the image sensor such that during the imaging operation for obtaining two rows of pixel data each row of pixel data corresponds to at least a portion of the optical code or target;
      an actuator operatively coupled to a first carrier housing the at least one objective lens for moving the first carrier along the optical axis; and
      a motor operatively coupled to a second carrier having a plurality of optical elements, wherein the actuator and motor can be operated simultaneously and non-simultaneously for moving the first carrier and the second carrier simultaneously and non-simultaneously, respectively, for further focusing the image on the at least one one-dimensional image sensor array.

* * * * *